J. N. JENSEN.
STANCHION.
APPLICATION FILED OCT. 11, 1913.
1,106,713.
Patented Aug. 11, 1914.
2 SHEETS—SHEET 1.
FIG_1_
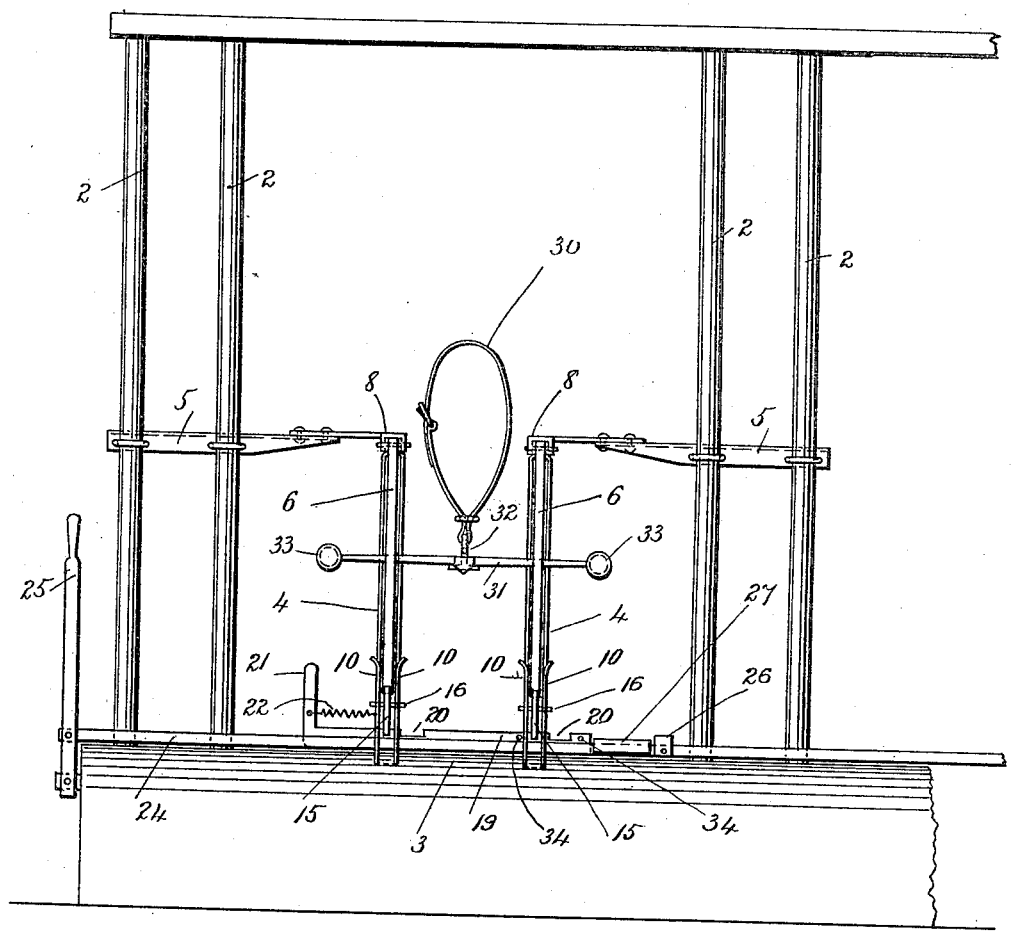

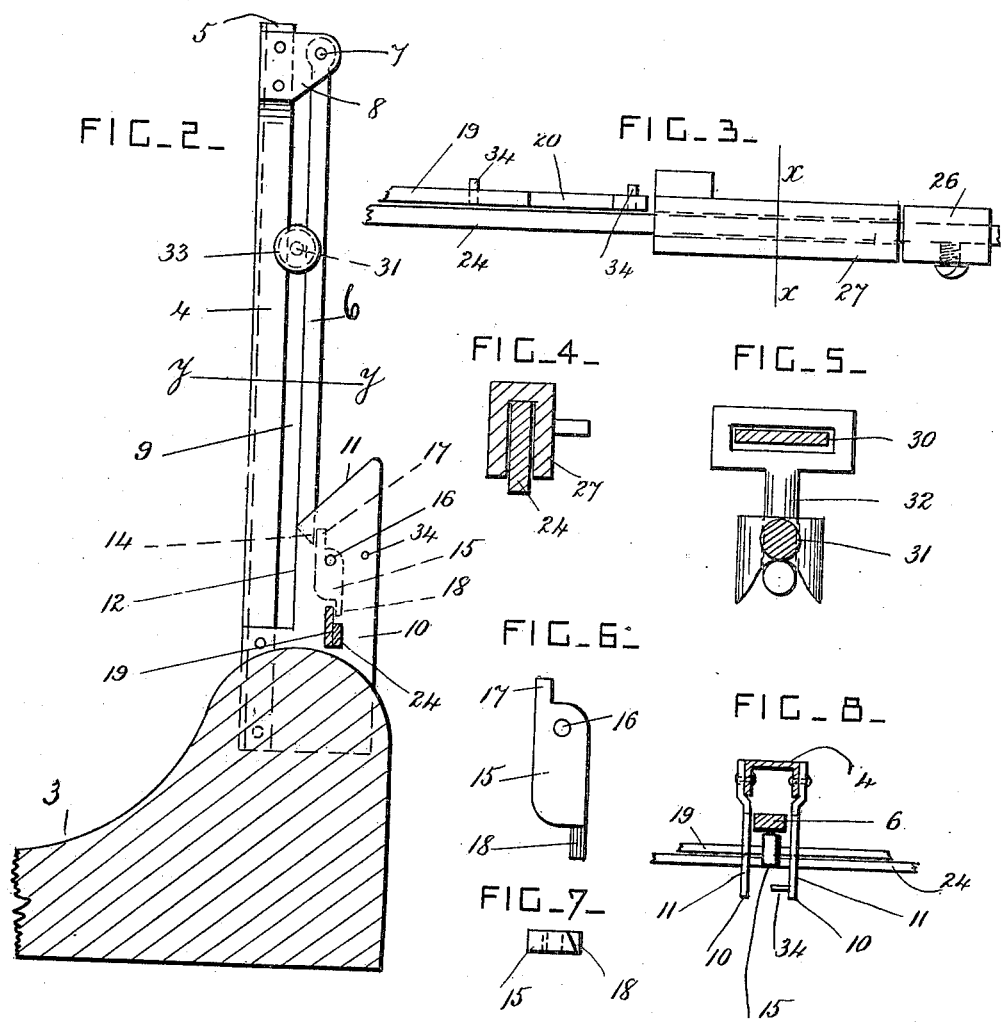

UNITED STATES PATENT OFFICE.

JULIUS N. JENSEN, OF LAKE CITY, COLORADO.

STANCHION.

1,106,713.  Specification of Letters Patent.  Patented Aug. 11, 1914.

Application filed October 11, 1913. Serial No. 794,705.

*To all whom it may concern:*

Be it known that I, JULIUS N. JENSEN, a subject of the Emperor of Germany, residing at Lake City, in the county of Hinsdale and State of Colorado, have invented certain new and useful Improvements in Stanchions; and I do hereby declare the following to be a full, clear, and exact description of the invention, such as will enable others skilled in the art to which it appertains to make and use the same.

This invention relates to stanchions for securing cattle in stalls; and it consists in the novel construction and combination of the parts hereinafter fully described and claimed whereby each animal may lock itself automatically when driven into its stall, and whereby all or any one of the animals may be released at will.

In the drawings, Figure 1 is a front view of a stanchion constructed according to this invention. Fig. 2 is a side view of one of the locking-posts, drawn to a larger scale. Fig. 3 is a plan view of portions of the locking and releasing bars. Fig. 4 is a cross-section taken on the line $x$—$x$ in Fig. 3. Fig. 5 is a detail view of the swivel on the collar. Fig. 6 is a detail view of one of the latches. Fig. 7 is an end view of the same. Fig. 8 is a cross-section through one of the locking-posts, taken on the line $y$—$y$ in Fig. 2.

A supporting frame is provided having uprights 2, and a manger 3 or feed-trough is arranged to the rear of the uprights. Locking-posts 4 are arranged in pairs between certain of the uprights, and are preferably channel-shaped in cross-section, and are secured to the floor at their lower ends. The locking-posts are connected to the adjacent uprights by any suitable braces 5, and the uprights, locking-posts and braces form a barrier in front of the manger so that the animal can only get at the food in the manger by reaching downwardly for it in the space between the pair of locking-posts. As many stalls or spaces for animals as desired can be arranged in a row, each one being provided with a pair of locking-posts and co-acting parts as hereinafter described.

A pendulum-rod 6 is suspended by a pin 7 from a bracket 8 secured to the top of each locking-post. The opening of the channel faces the rear, and the bottom end portion of the pendulum-rod is arranged to enter the channel of the locking-post when swung forwardly. The pendulum-rod is arranged to hang vertically and to the rear of the locking-post, and a space 9 is formed between these two parts. Guide-plates 10 are secured to the floor or to the locking-posts, and are preferably arranged in pairs, one on each side of each locking-post. The upper end portion of each guide-plate has a downwardly and forwardly inclined surface 11, and a vertical portion 12 is formed at the lower end of the surface 11. This vertical portion 12 is arranged in line with the front side of the pendulum-rod, and the lower end 14 of the pendulum-rod is preferably beveled, and is arranged to work between the guide-plates at the lower part of their inclined surfaces 11.

A latch 15 is pivoted on a pin 16 between each pair of guide-plates, and has a lug 17 at its upper end which engages with the pendulum-rod, and normally prevents it from moving rearwardly. The lower part of the latch is provided with a lug 18.

A locking-bar 19 is arranged to slide longitudinally in holes in the guide-plates, and extends crosswise behind the lug 18, and normally prevents the pendulum-rod from moving rearwardly. This locking-bar has notches 20, and it has a handle portion 21 at one end. A spring 22 is provided between the handle portion and one of the guide-plates, to hold the notches 20 out of line with the lugs 18. When the locking-bar is slid by hand to place the notches 20 in front of the lugs 18, the latch 15 is unlocked so that the pendulum-bar can be moved rearwardly on its pivot. When the pendulum-bar returns to its vertical position, its beveled end passes over the lug 17 of the latch irrespective of the position of the locking-bar.

A releasing-bar 24 is provided, and slides in the holes in the guide-plates behind the locking-bar. This releasing-bar is narrower than the locking-bar, and it is arranged under the lugs 18, and it extends across all the stalls. A lever 25, or other suitable operating device, is provided at one end of the releasing-bar, clear of the stalls, so that all the animals can be released without going into any one of the stalls. A stop 26 is secured to the releasing-bar, and a removable block 27 is arranged between the stop 26 and the opposite end of the locking-bar from its handle. The block 27 is preferably channel-shaped so that it straddles the releasing-bar and engages with it so that the block is not displaced too easily. When any one of the blocks 27 is removed, the locking-bar pertaining to it is not operated by the releasing-bar, and in this way any or all of the pairs of latches can be released at will by the releasing-bar.

Each animal is provided with a collar 30, which is secured around its neck in any approved manner, and this collar has a crossbar 31 suspended from it by a swivel 32. The swivel is constructed so that the crossbar is normally held crosswise of the animal, and so that it may be moved freely to a limited extent, and will return automatically to its normal crosswise and horizontal position. The crossbar preferably has hollow balls 33 on its ends, and it is longer than the width of the space between each pair of locking-posts. Stop pins 34 are provided to limit the movements of the locking-bar, and the latches. When the animals are driven into the stalls, each crossbar strikes against a pair of pendulum-rods, and when the animal reaches downwardly for the food in the manger, the crossbar slides down the inclined surfaces 11 of the guide-plates into the lower parts of the spaces 9, pushing the pendulum-rods forwardly, and passing under their lower ends. The pendulum-rods move backwardly by gravity as soon as the crossbar has passed under them, and the animal may raise its head to place the crossbar in the position shown, but it cannot back away from the locking-posts until the locking-bar has been moved by hand to permit the pendulum-rods to move rearwardly.

What I claim is:

1. In a stanchion, the combination, with a pair of stationary locking-posts, of pendulum-rods suspended behind the locking-posts, stationary guides arranged at the lower ends of the pendulum-rods, spaces being formed between the locking-posts and the pendulum-rods and guides, means for normally preventing the pendulum-rods from moving rearwardly, and a crossbar provided with means for securing it to an animal and adapted to push the pendulum-rods forwardly and to pass under them into engagement with the said spaces.

2. In a stanchion, the combination, with a pair of channel-shaped locking-posts having rearwardly projecting brackets at their upper ends, of pendulum-rods suspended from the said brackets, stationary guides arranged at the lower ends of the pendulum-rods, spaces being formed between the locking-posts and the pendulum-rods and guides, means which normally prevent the pendulum-rods from moving rearwardly and which permit their lower ends to be moved forwardly into the channels of the locking-posts, and a crossbar provided with means for securing it to an animal and adapted to push the pendulum-rods forwardly and to pass under them into engagement with the said spaces.

3. In a stanchion, the combination, with a pair of stationary locking-posts, of pendulum-rods suspended behind the locking-posts, spaces being formed between the said posts and rods, stationary guide-plates arranged at the lower ends of the pendulum-rods and having downwardly and forwardly inclined upper parts and having front edges arranged substantially in line with the front sides of the pendulum-rods, means for normally preventing the pendulum-rods from moving rearwardly, and a crossbar provided with means for securing it to an animal and adapted to push the pendulum-rods forwardly and to pass under them into engagement with the said spaces.

4. In a stanchion, the combination, with a pair of stationary locking-posts, of pendulum-rods suspended behind the locking-posts, stationary guides arranged at the lower ends of the pendulum-rods, spaces being formed between the locking-posts and the pendulum-rods and guides, latches pivoted to the guides, and a locking-bar slidable crosswise of the guides and normally preventing the latches from moving in one direction, the pendulum-rods being adapted to engage automatically with the latches in swinging forwardly to a vertical position.

5. In a stanchion, the combination, with a pair of stationary locking-posts, of pendulum-rods suspended behind the locking-posts, stationary guides arranged at the lower ends of the pendulum-rods, spaces being formed between the locking-posts and the pendulum-rods and guides, latches pivoted to the guides, a locking-bar slidable crosswise of the guides and normally preventing the latches from moving in one direction, the pendulum-rods being adapted to engage automatically with the latches in swinging forwardly to a vertical position, a releasing-bar slidable parallel to the locking-bar and provided with a stop, and a removable block arranged between the said stop and the locking-bar.

In testimony whereof I affix my signature, in presence of two witnesses.

JULIUS N. JENSEN.

Witnesses:
V. T. FAIRES,
G. W. RAWLINGS.